(12) United States Patent
Mutagi et al.

(10) Patent No.: US 11,797,629 B2
(45) Date of Patent: *Oct. 24, 2023

(54) CONTENT GENERATION FRAMEWORK

(71) Applicant: Amazon Technologies, Inc., Seattle, WA (US)

(72) Inventors: Rohan Mutagi, Redmond, WA (US); Rongzhou Shen, Bothell, WA (US); Vibhunandan Gavini, Mercer Island, WA (US); Hassan Haider Malik, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,196

(22) Filed: Jan. 3, 2023

(65) Prior Publication Data

US 2023/0148355 A1 May 11, 2023

Related U.S. Application Data

(63) Continuation of application No. 17/099,295, filed on Nov. 16, 2020, now Pat. No. 11,580,182, which is a continuation of application No. 15/712,925, filed on Sep. 22, 2017, now Pat. No. 10,878,047.

(51) Int. Cl.
| | | |
|---|---|---|
| *G06F 16/90* | (2019.01) | |
| *G06F 16/9535* | (2019.01) | |
| *G06F 40/00* | (2020.01) | |
| *G06F 16/9032* | (2019.01) | |
| *G06F 16/332* | (2019.01) | |
| *G10L 15/18* | (2013.01) | |

(52) U.S. Cl.
CPC ...... *G06F 16/9535* (2019.01); *G06F 16/3329* (2019.01); *G06F 16/90332* (2019.01); *G06F 40/00* (2020.01); *G10L 15/1815* (2013.01)

(58) Field of Classification Search
None
See application file for complete search history.

(56) References Cited

U.S. PATENT DOCUMENTS

| | | | |
|---|---|---|---|
| 2011/0113358 A1* | 5/2011 | Nielsen ............... | G06Q 10/10 715/765 |
| 2014/0282153 A1* | 9/2014 | Christiansen ...... | G06Q 30/0269 715/765 |
| 2016/0070449 A1* | 3/2016 | Christiansen ......... | G06F 16/288 715/765 |

* cited by examiner

*Primary Examiner* — Jau Shya Meng
(74) *Attorney, Agent, or Firm* — PIERCE ATWOOD LLP

(57) ABSTRACT

Techniques for performing outputting additional content associated with but nonresponsive to an input command are described. A system receives input data from a device. The system determines an intent representing the input data and receives first output data responsive to the input data. The system determines, based on context data, that additional content associated with the first output data but nonresponsive to the input data should be output. The system receives second output data associated with but nonresponsive to the input data thereafter. The system then presents first content corresponding to the first output data and second content corresponding to the second output data.

20 Claims, 12 Drawing Sheets

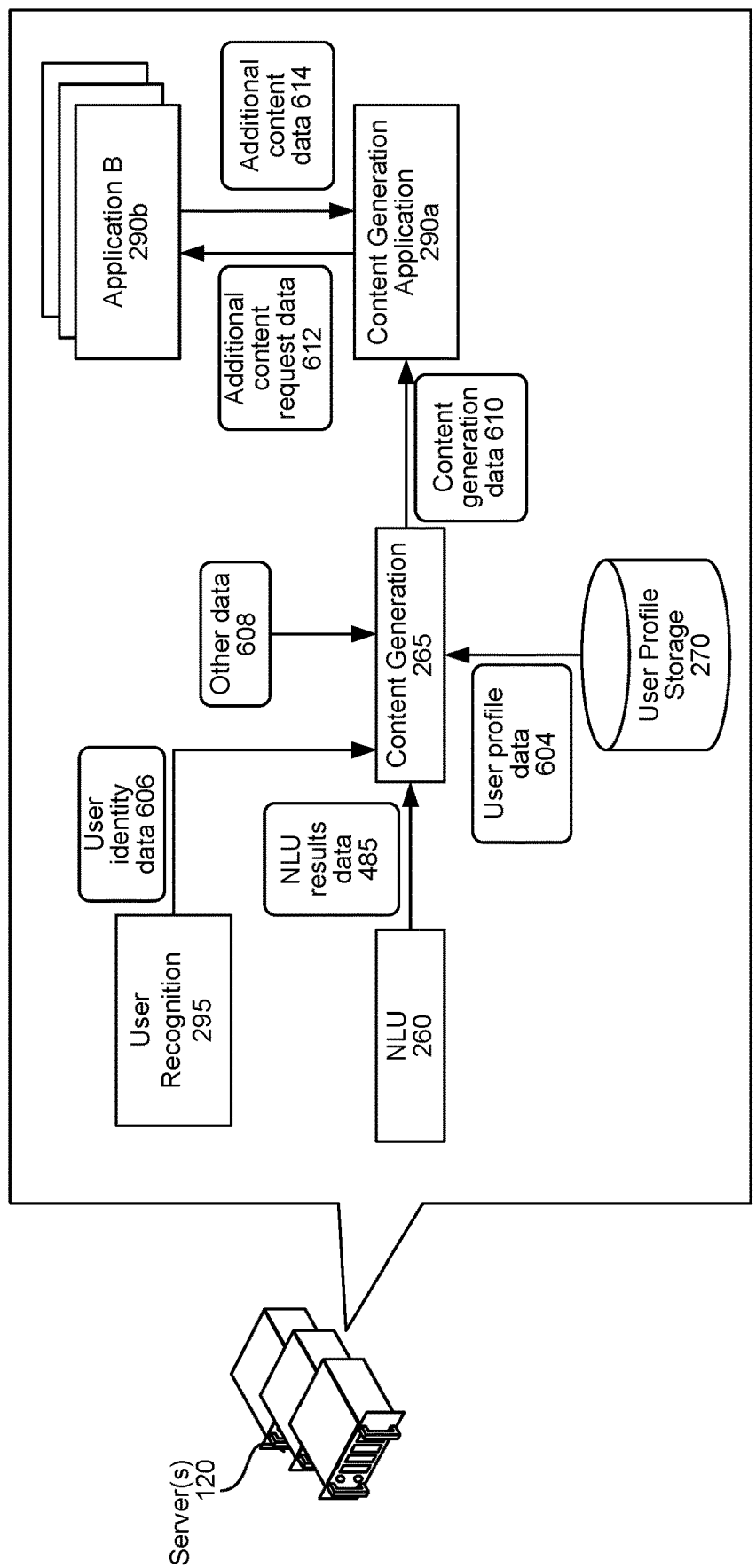

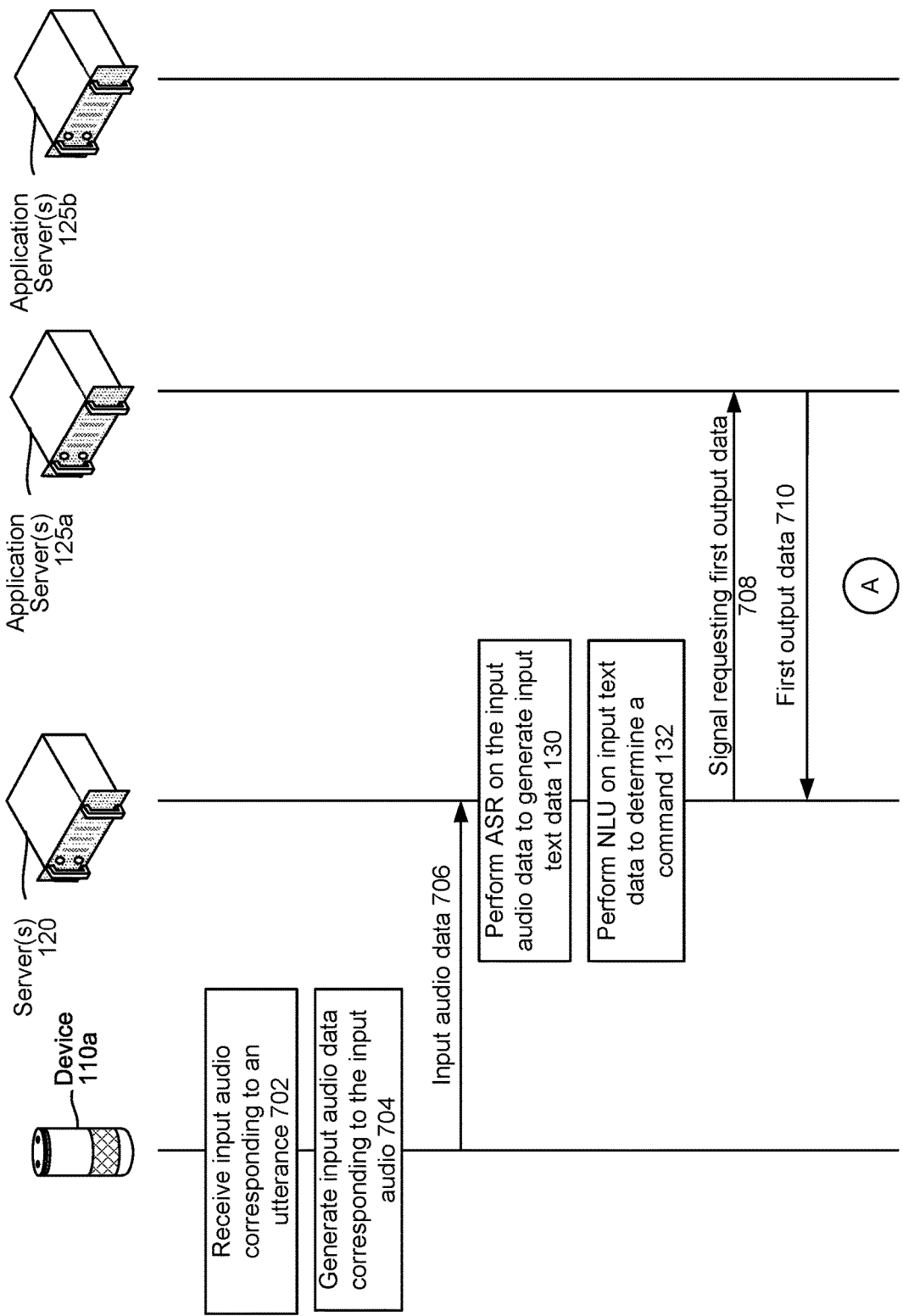

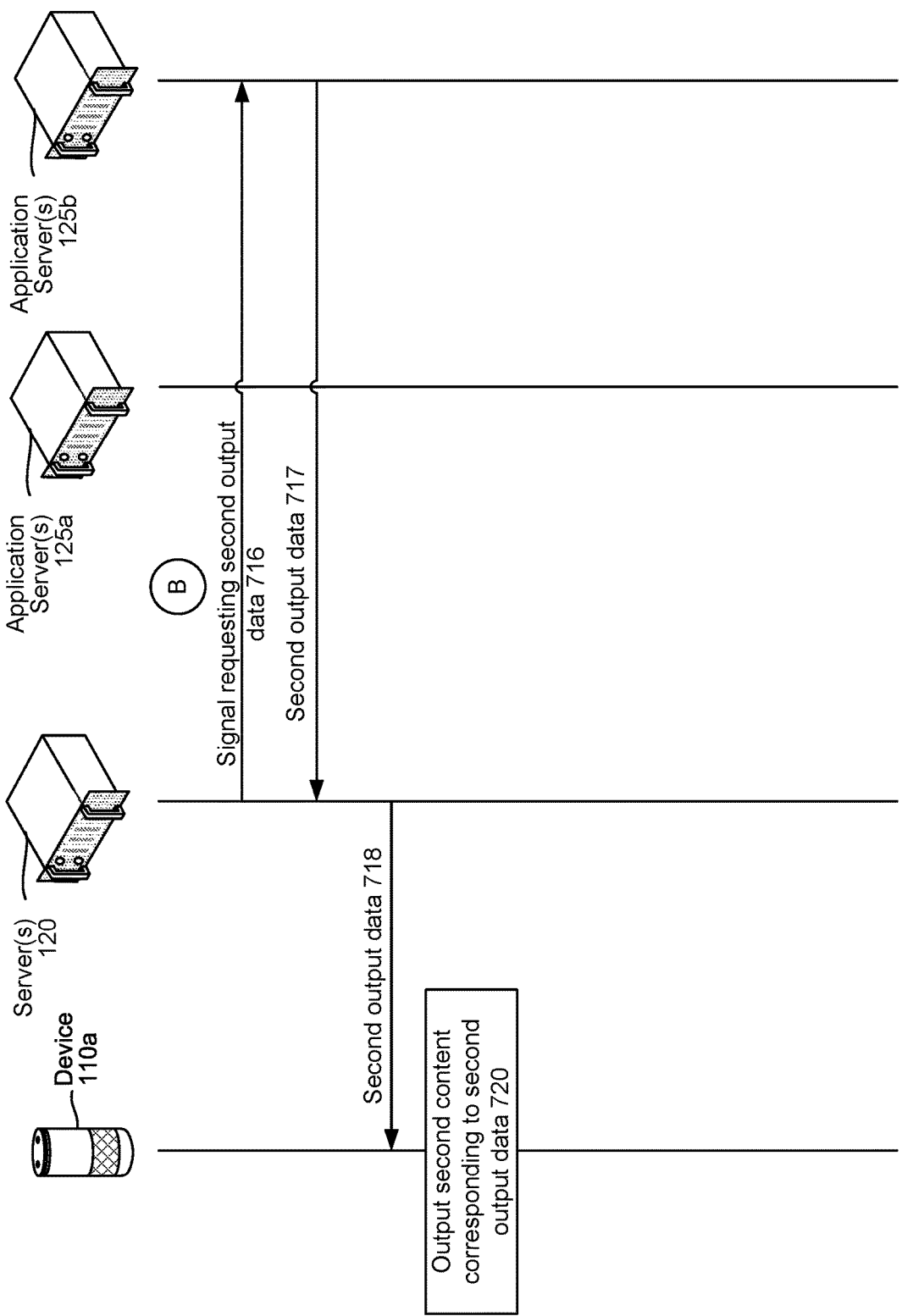

CONTENT GENERATION FRAMEWORK

BACKGROUND

This application is a continuation of, and claims the benefit of priority of U.S. Non-Provisional patent application Ser. No. 17/099,295, filed Nov. 16, 2020, and entitled "CONTENT GENERATION FRAMEWORK", which claims the benefit of priority of U.S. Non-Provisional patent application Ser. No. 15/712,925, filed Sep. 22, 2017, and entitled "CONTENT GENERATION FRAMEWORK", issued on Dec. 29, 2020 as U.S. Pat. No. 10,878,047, the contents of which are herein expressly incorporated by reference in their entireties.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 is a conceptual diagram of how a system determines additional content associated with but not directly responsive to a command as well as determines whether the additional content should be output according to embodiments of the present disclosure.

FIGS. 7A through 7C are a signal flow diagram illustrating the output of additional content according to embodiments of the present disclosure.

DETAILED DESCRIPTION

Figure 1:
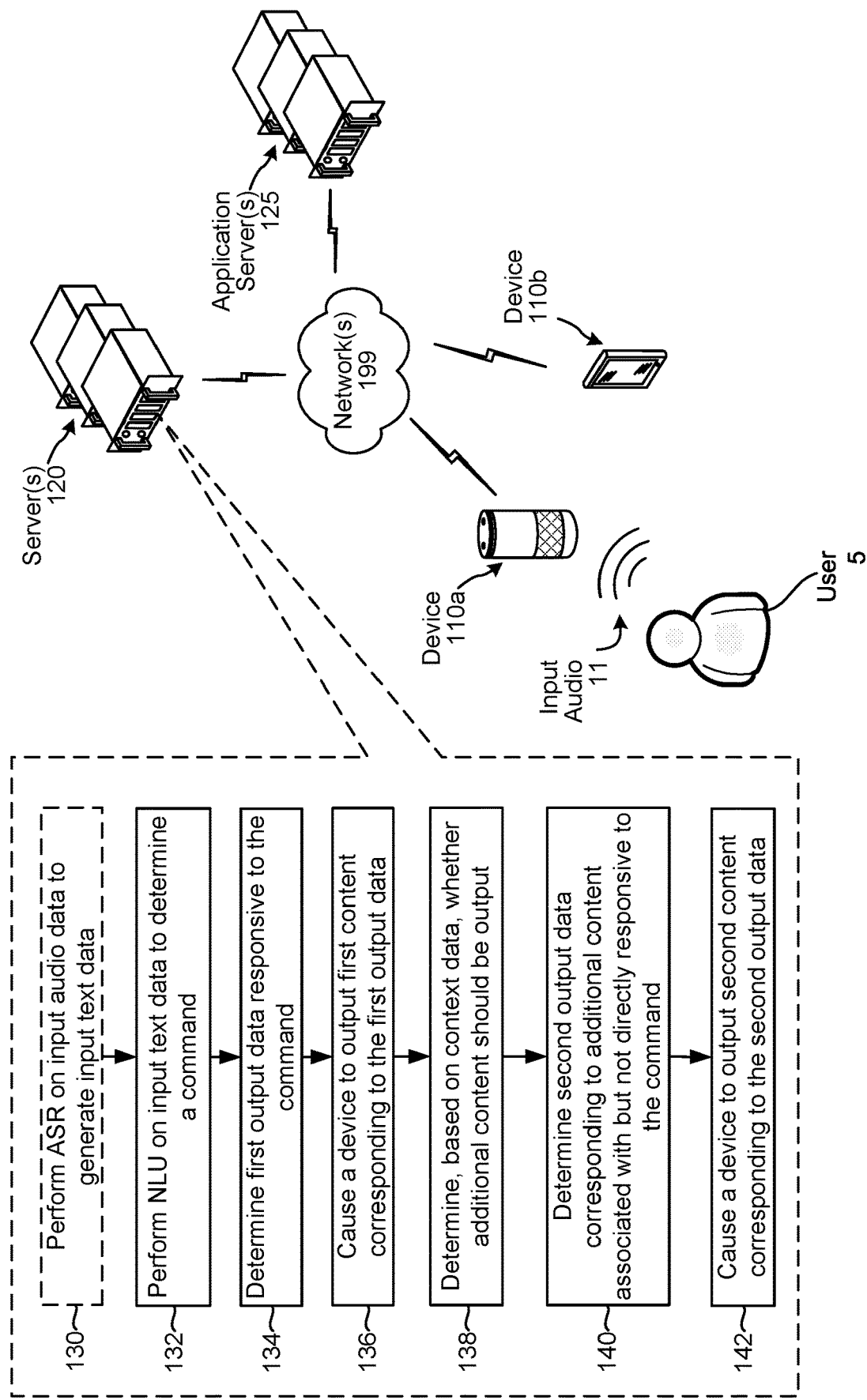
FIG. 1 illustrates a system configured to determine first content responsive to a command as well as determine second content associated with but not responsive to the command according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. The system may be configured to simply provide a user with content directly responsive to user's request. For example, a user may say "Alexa, what is the weather." In response, the system may output weather information. For further example, a user may say "Alexa, play Adele." In response, the system may output music sang by Adele.

The system may be configured with multiple applications (e.g., thousands of applications) that can be used to potentially respond to a user command. For example, the system may include weather applications, music applications, video applications, calendar applications, timer applications, general knowledge answering applications, game applications, etc. The system may be configured to provide content to a user that is provided from a single application that the system determines to be responsive to the user's command. For example, if a user says "Alexa, what is the weather," the system may be configured to only output content provided by a weather application, as that is what the user asked for. For further example, if a user says "Alexa, play Adele," the system may be configured to only output content provided by a music streaming application.

The present disclosure improves speech controlled computing systems by enabling a system to proactively output additional content (provided by potentially multiple applications) to a user, even when the user did not necessarily request the additional content. The additional content and timing/frequency of such proactive output of the additional content is selected and timed to improve the user experience and provide the user with information determined to be potentially appreciated by the user, even if not expressly requested by the user in the initial command.

As an example, the system may receive, from a user, a command requesting content. The system determines content responsive to the request from a first application. The system also determines whether additional content related to the content responsive to the request should be output, where the additional content may not necessarily be directly responsive to the initial request. The system makes such determinations using various contextual information, such as user specification information (e.g., age, location, culture, etc.) as well as system processing information (e.g., NLU results, results from the first application, or the like). The system then solicits the additional information from a second application which may be different from the first application that provided the content that is directly responsive to the request for information. For example, if a user says "Alexa, book me a ticket to Seattle," the system may book the user a ticket to Seattle using a ticket booking application and may output "I booked your ticket, the weather in Seattle is sunny with a high of eighty degrees."

A system implementing the present disclosure may also use a variety of contextual information to determine whether the additional content should be output by the system. The contextual information may include user preferences indicating when and how the user permits additional information be output. The contextual information also includes content of NLU results. Thus, the present disclosure enables a system to provide a user with additional information only in situations where the additional information will be useful to the user.

FIG. 1 illustrates a system for determining first content responsive to a command as well as determining second content associated with but not responsive to the command. Although the figures and discussion illustrate certain operational steps of the system in a particular order, the steps described may be performed in a different order (as well as certain steps removed or added) without departing from the intent of the disclosure. Devices (110a/110b) local to a user 5, one or more server(s) 120, and one or more application servers 125 may communicate across one or more networks 199.

The device 110a may receive input audio 11 corresponding to a spoken utterance originating from the user 5. The device 110a generates input audio data corresponding to the input audio 11 and sends the input audio data to the server(s) 120.

Alternatively, the device 110b may receive input from the user 5 corresponding to text via a touch screen providing a virtual keyboard. The device 110b may generate input text data corresponding to the input text. The device 110b may send the input text data to the server(s) 120 via a companion application operating on the device 110b and in communication with the server(s) 120.

If the server(s) 120 receives input audio data from the device 110a, the server(s) 120 performs (130) ASR on the input audio data to generate input text data. The server(s) 120 performs NLU on input text data (i.e., received from the device 110b or generated by performing ASR on input audio data received from the device 110a) to determine a command represented in the input text data. The command may correspond to a user instruction for the system to perform an action. For example, the command may correspond to "play music," "book a ticket to Seattle," "what is the weather," etc.

The server(s) 120 determines (134) first output data responsive to the command. The server(s) 120 may determine the first output data is located in a 1P storage (e.g., one maintained and/or operated by the server(s) 120). Alternatively, the server(s) 120 may determine the first output data may be provided by a 1P application (e.g., one maintained and/or operated by the server(s) 120). Moreover, the server(s) 120 may determine the first output data may be provided by a 3P application (e.g., one not maintained or operated by the server(s) 120, but in communication with the server(s) 120, such as one maintained and/or operated by an application server(s) 125). If the server(s) 120 determines the first output data may be provided by a 3P application, the server(s) 120 may solicit an application server(s) 125 maintaining and/or operating the 3P application to provide the server(s) 120 with the first output data.

The server(s) 120 causes (136) a device (110a/110b) to output first content corresponding to the first output data. For example, the server(s) 120 may cause the device 110a and/or the device 110b to output first audio corresponding to the first output data. For further example, the server(s) 120 may cause the device 110b to display first text corresponding to the first output data.

The server(s) 120 determines (138), based on context data, whether additional content should be output to the user 5. For example, the context data may include explicit user preferences, an age of the user 5, a culture of the user 5, a system usage history of the user 5, etc. Additional content may corresponding to content that is not directly responsive to the command (e.g., was not solicited by the command originating user 5) but is associated with the command.

If the server(s) 120 determines additional content should be output to the user 5, the server(s) 120 determines (140) second output data corresponding to additional content associated with but not directly responsive to the command. For example, if the command corresponds to "tell me the score of the Seattle Mariners game," the additional content may indicate to the user 5 that the Seattle Mariners game can be live streamed from a particular source. For further example, if the command corresponds to "start Jeopardy game," the additional content may indicate to the user 5 some other system operated game that the user 5 may like. Yet further, for example, if the command corresponds to "play Adele," the additional content may indicate to the user 5 that Adele is performing the following week in a city near the user 5. Like the first output data, the server(s) 120 may receive the second output data from a 1P storage, a 1P application, or an application server(s) 125 maintaining and/or operating a 3P application.

The server(s) 120 causes (142) a device (110a/110b) to output second content corresponding to the second output data corresponding to the additional content. For example, the server(s) 120 may cause the device 110a and/or the device 110b to output second audio corresponding to the second output data. For further example, the server(s) 120 may cause the device 110b to display second text corresponding to the second output data.

The server(s) 120 may cause the device (110/110b) to output the second content after the device (110a/110b) is finished outputting the first content. For example, for a command corresponding to "tell me the score of the Seattle Mariners game," after the device (110a/110b) finished outputting TTS generated first content corresponding to the score of the Seattle Mariners game, the device (110a/110b) may output TTS generated second content indicating the Seattle Mariners game can be live streamed from a particular source. For further example, for a command corresponding to "start Jeopardy game," after the device (110a/110b) finishes interacting with the user 5 with respect to a system operated Jeopardy game, the device (110a/110b) may output TTS generated second content indicating some other system operated game that the user 5 may like.

The server(s) 120 may alternatively cause the device (110a/110b) to output the second content prior to the first content. For example, for a command corresponding to "play Adele," since the system may output multiple Adele songs to the user in sequence, the device (110a/110b) may output TTS generated second content indicating Adele is performing the following week in a city near the user 5 prior to the device (110a/110b) outputting first content corresponding to Adele music.

Figure 2:
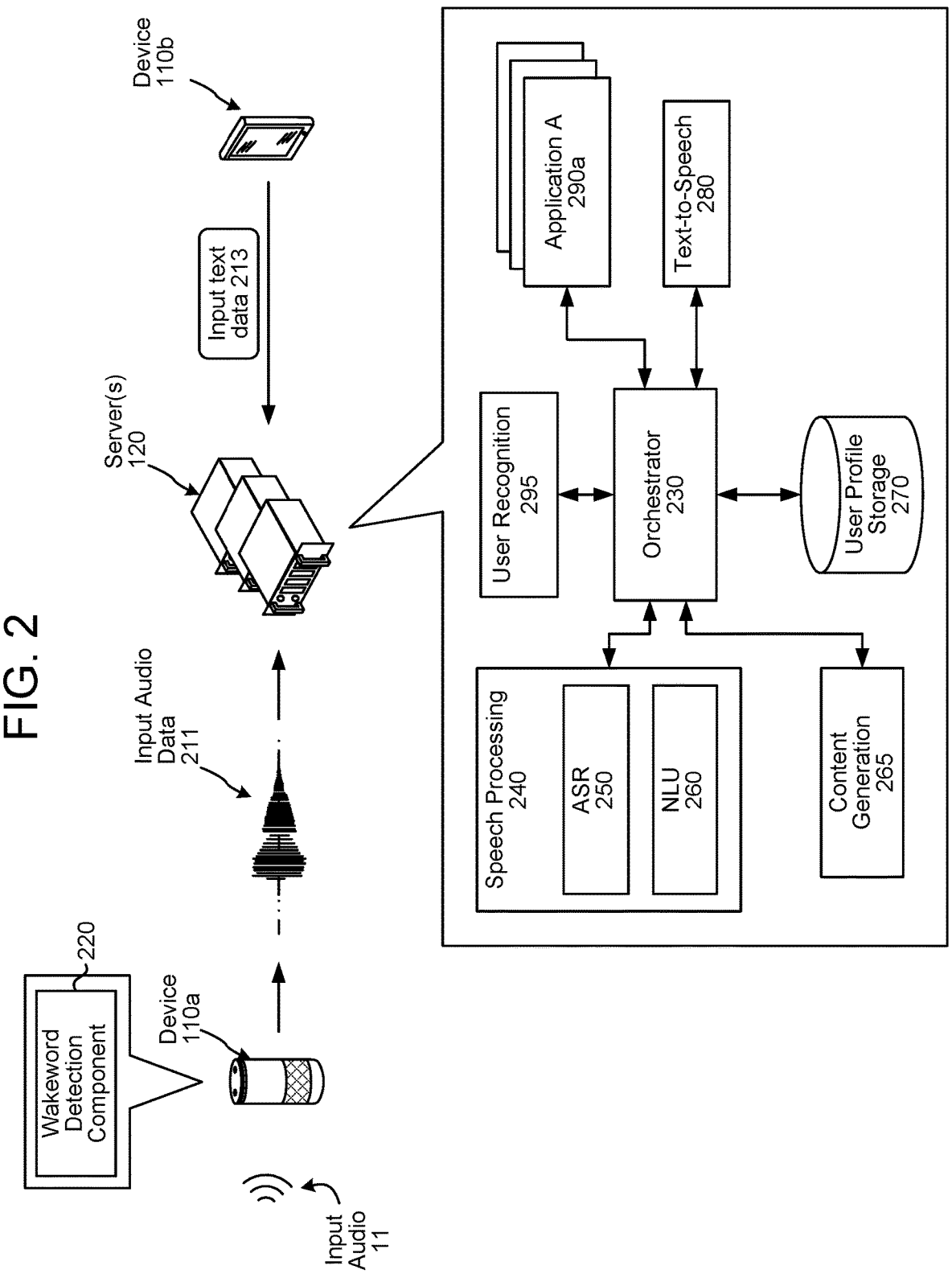
FIG. 2 is a conceptual diagram of components of a system according to embodiments of the present disclosure.

The system may operate using various components as described in FIG. 2. The various components may be located on a same or different physical devices. Communication between various components may occur directly or across a network(s) 199.

The device 110a may receive the input audio 11 using an audio capture component, such as a microphone or microphone array. The device 110a, using a wakeword detection component 220, processes audio data corresponding to the input audio 11 to determine if a keyword (e.g., a wakeword) is detected in the audio data. Following detection of a wakeword, the device 110a sends input audio data 211 to the server(s) 120. The input audio data 211 at least partially corresponds to input audio captured subsequent to input audio corresponding to the wakeword. That is, the input audio data 211 corresponds to a spoken command following a spoken wakeword, and optionally includes the spoken wakeword.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing the spoken command represented in the input audio data 211. The ASR component 250 interprets the spoken command represented in the input audio data 211 based on a similarity between the spoken command and pre-established language models. For example, the ASR component 250 may compare the input audio data 211 with models for sounds (e.g., subword units, such as phonemes, senons, etc.) and sequences of sounds to identify words that match the sequence of sounds corresponding to the spoken command represented in the input audio data 211. The ASR component 250 sends the input text data generated thereby to an NLU component 260 of the speech processing component 260. The input text data sent from the ASR component 250 to the NLU component 260 may include a top scoring hypothesis or may include an N-best list including multiple hypotheses. An N-best list may additionally include a score associated with each hypothesis represented therein. Each score may indicate a confidence of ASR processing performed with respect to the hypothesis with which it is associated.

Alternatively, the device 110b may send input text data 213 to the server(s) 120. Upon receipt by the server(s) 120, the input text data 213 may be sent to the orchestrator component 230. The orchestrator component 230 may send the input text data 213 to the NLU component 260.

The NLU component 260 attempts to make a semantic interpretation of the phrases or statements represented in the input text data input therein. That is, the NLU component 260 determines one or more meanings associated with the phrases or statements represented in the input text data based on individual words represented in the input text data. The NLU component 260 determines an intent of the command represented in the input text data (e.g., an action that a user desires be performed) as well as pertinent pieces of information in the input text data that allow a device (e.g., the device 110a, the device 110b, the server(s) 120, the application server(s) 125, etc.) to execute the intent. For example, if the input text data corresponds to "call mom," the NLU component 260 may determine a user intended to activate a telephone in his/her device and to initiate a call with a contact matching the entity "mom."

The server(s) 120 may include a user recognition component 295. The user recognition component 295 may take as input the input audio data 211 and/or input text data output by the ASR component 250. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing speech characteristics in the input audio data 211 to stored speech characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU component processes, processing performed by applications 290, as well as processes performed by a content generation component 265.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a respective unique user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

The server(s) 120 may also include various 1P applications 290 (as illustrated in FIG. 2). It should be appreciated that the server(s) 120 may additionally or alternatively communicate with one or more application servers 125 executing 3P applications.

An "application," as used herein, may be considered synonymous with a "skill." A skill may be software akin to an application. That is, a skill may enable the server(s) 120 or other the application server(s) 125 to execute specific functionality in order to provide output data to the user 5. The system may be configured with more than one skill. A skill may either be executed by the server(s) 120 or merely associated with the server(s) 120 (i.e., one executed by the application server(s) 125). For example, a weather service skill may enable the server(s) 120 to execute a command with respect to a weather service application server(s), a car service skill may enable the server(s) 120 to execute a command with respect to a taxi or ride sharing service application server(s), an order pizza skill may enable the server(s) 120 to execute a command with respect to a restaurant application server(s), etc.

The server(s) 120 may include a TTS component 280 that generates audio data from text data using one or more different methods. In one method of synthesis called unit selection, the TTS component 280 matches text data against a database of recorded speech. The TTS component 280 selects matching units of recorded speech matching the text data and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system may include a content generation component 265 that determines whether additional content associated with the command but not directly responsive to the command should be output to the user 5. Specifically, the content generation component 265 proactively selects additional content that is not necessarily responsive to an input command but may nonetheless be beneficial to the user, for example due to its relation to the original requested content. The content generation component 265 is described in further detail below.

The content generation component 265 may communication directly with the user profile storage 270. Moreover, while FIG. 2 illustrates components of the server(s) 120 communicating via the orchestrator component 230, one skilled in the art will appreciated that various components of the server(s) 120 may communication directly.

Figure 3:
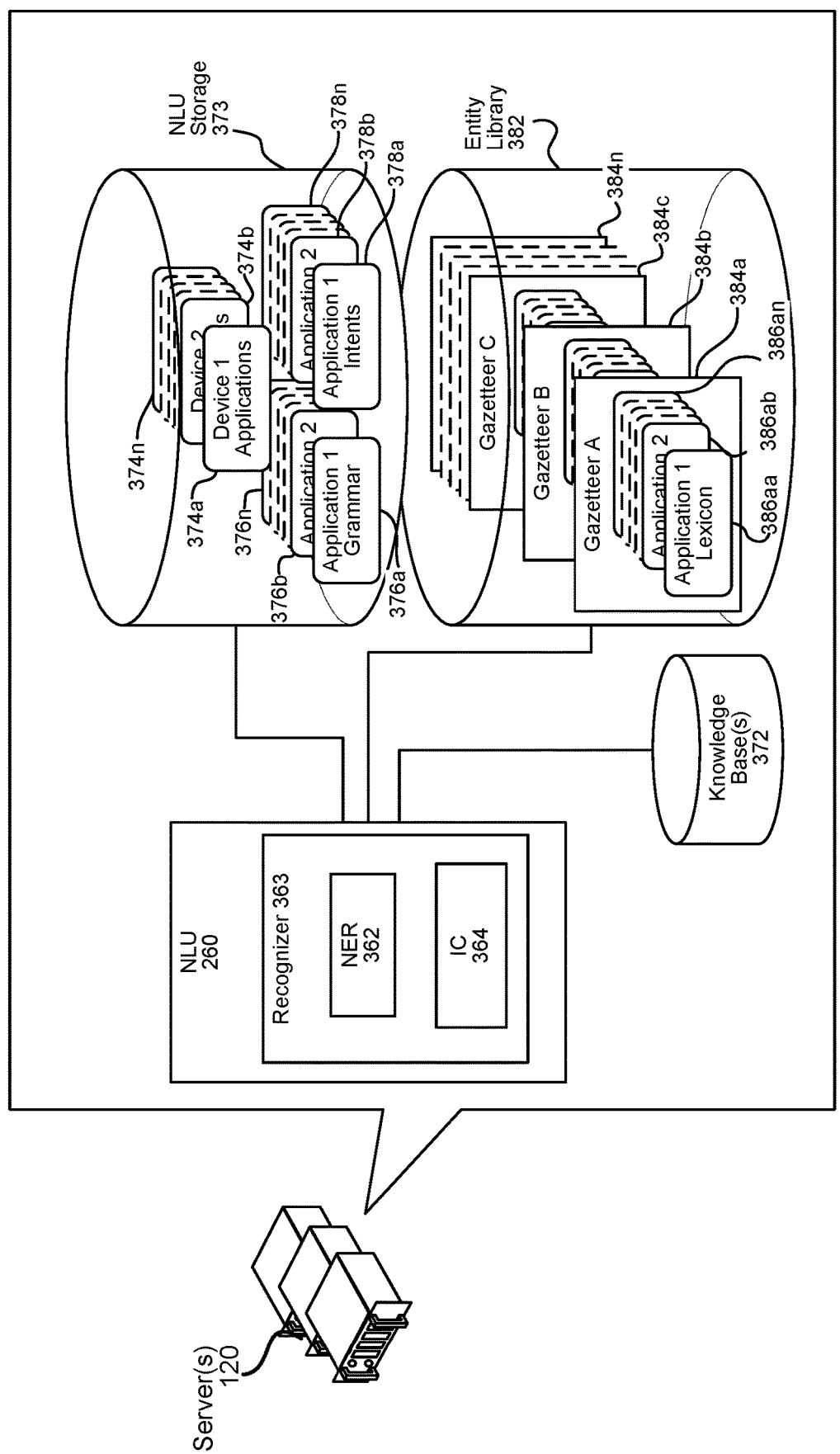
FIG. 3 is a conceptual diagram of how natural language processing is performed according to embodiments of the present disclosure.

FIG. 3 illustrates how NLU processing is performed on input text data. Generally, the NLU component 260 attempts to make a semantic interpretation of text represented in text data input thereto. That is, the NLU component 260 determines the meaning behind text represented in text data based on the individual words and/or phrases. The NLU component 260 interprets text to derive an intent or a desired action from the user as well as the pertinent pieces of information in the text that allow a device (e.g., the device 110*a*, the device 110*b*, the server(s) 120, the application server(s) 125) to complete that action. For example, if the NLU component 260 receives text data including text corresponding to "tell me the weather," the NLU component 260 may determine that the user intends the system to output weather information.

The NLU component 260 may process text data including several hypotheses of a single command. For example, if the ASR component 250 outputs text data including an N-best list of hypotheses, the NLU component 260 may process the text data with respect to all (or a portion of) the hypotheses represented therein.

The NLU component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include one or more recognizers 363. Each recognizer 363 may be associated with a different application 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text represented in text data input therein. The NER component 362 identifies portions of text represented in text data input into the NLU component 260 that correspond to a named entity that may be applicable to processing performed by an application associated with the recognizer 363 implementing the NER component 362. The NER component 362 (or other component of the NLU component 260) may also determine whether a word refers to an entity that is not explicitly mentioned in the text, for example "him," "her," "it" or other anaphora, exophora or the like.

Each recognizer 363, and more specifically each NER component 362, may be associated with a particular grammar model 376, a particular set of intents/actions 378, and a particular personalized lexicon 386. A gazetteer 384 may include application-indexed lexical information associated with a particular user and/or device. For example, a Gazetteer A (384*a*) includes application-indexed lexical information 386*aa* to 386*an*. A user's music application lexical information might include album titles, artist names, and song names, for example, whereas a user's contact list application lexical information might include the names of contacts. Since every user's music collection and contact list is presumably different, this personalized information improves entity resolution.

An NER component 362 applies grammar models 376 and lexical information 386 associated with the application (associated with the recognizer 363 implementing the NER component 362) to determine a mention of one or more entities in text data input therein. In this manner, the NER component 362 identifies "slots" (i.e., one or more particular words in text data) that may be needed for later command processing. The NER component 362 may also label each slot with a type (e.g., noun, place, city, artist name, song name, etc.).

Each grammar model 376 includes the names of entities (i.e., nouns) commonly found in speech about the particular application (i.e., generic terms) to which the grammar model 376 relates, whereas the lexical information 386 is personalized to the user and/or the device from which the input audio data 211 or input text data 213 originated. For example, a grammar model 376 associated with a shopping application may include a database of words commonly used when people discuss shopping.

A downstream process called entity resolution links a portion of text data to a specific entity known to the system. To perform entity resolution, the NLU component 260 may utilize gazetteer information (384*a*-384*n*) stored in an entity library storage 382. The gazetteer information 384 may be used to match text represented in text data output by the ASR component 250 with different entities, such as song titles, contact names, etc. Gazetteers 384 may be linked to users (e.g., a particular gazetteer may be associated with a specific user's music collection), may be linked to certain applications (e.g., a shopping application, a music application, a video application, a communications application, etc.), or may be organized in a variety of other ways.

Each recognizer 363 may also include an intent classification (IC) component 364. The IC component 364 parses text data input thereto to determine an intent(s) associated with the application (associated with the recognizer 363 implementing the IC component 364) that potentially corresponds to the command represented in the text data. An intent corresponds to an action to be performed that is responsive to the command represented by the text data. The IC component 364 may communicate with a database 378 of words linked to intents. For example, a music intent database may link words and phrases such as "quiet," "volume off," and "mute" to a "mute" intent. The IC component 364 identifies potential intents by comparing words and phrases in input text data to the words and phrases in an intents database 378 associated with the application that is associated with the recognizer 363 implementing the IC component 364.

The intents identifiable by a specific IC component 364 are linked to application-specific (i.e., the application associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic>intent may correspond to text data sentence structures such as "Play {Artist Name}," "Play {Album Name}," "Play {Song name}," "Play {Song name} by {Artist Name}," etc. However, to make entity resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic>may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the application 290 associated with the recognizer 363 implementing the NER component 362, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music application recognizer 363 may parse and tag text data including text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music application, which an IC component 364 (also implemented by the music application recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the hypothesis represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the application (in the knowledge base 372). For example, if the text data includes text corresponding to "play songs by the rolling stones," after failing to determine an album name or song name called "songs" by "the rolling stones," the NER component 362 may search the application vocabulary for the word "songs." In the alternative, generic words may be checked before the gazetteer information, or both may be tried, potentially producing two different results.

An NER component 362 may tag text of a hypothesis represented in text data to attribute meaning to the hypothesis. For example, an NER component 362 may tag "play mother's little helper by the rolling stones" as: {application} Music, {intent} Play Music, {artist name} rolling stones, {media type} SONG, and {song title} mother's little helper. For further example, the NER component 362 may tag "play songs by the rolling stones" as: {application} Music, {intent} Play Music, {artist name} rolling stones, and {media type} SONG.

Figure 4:
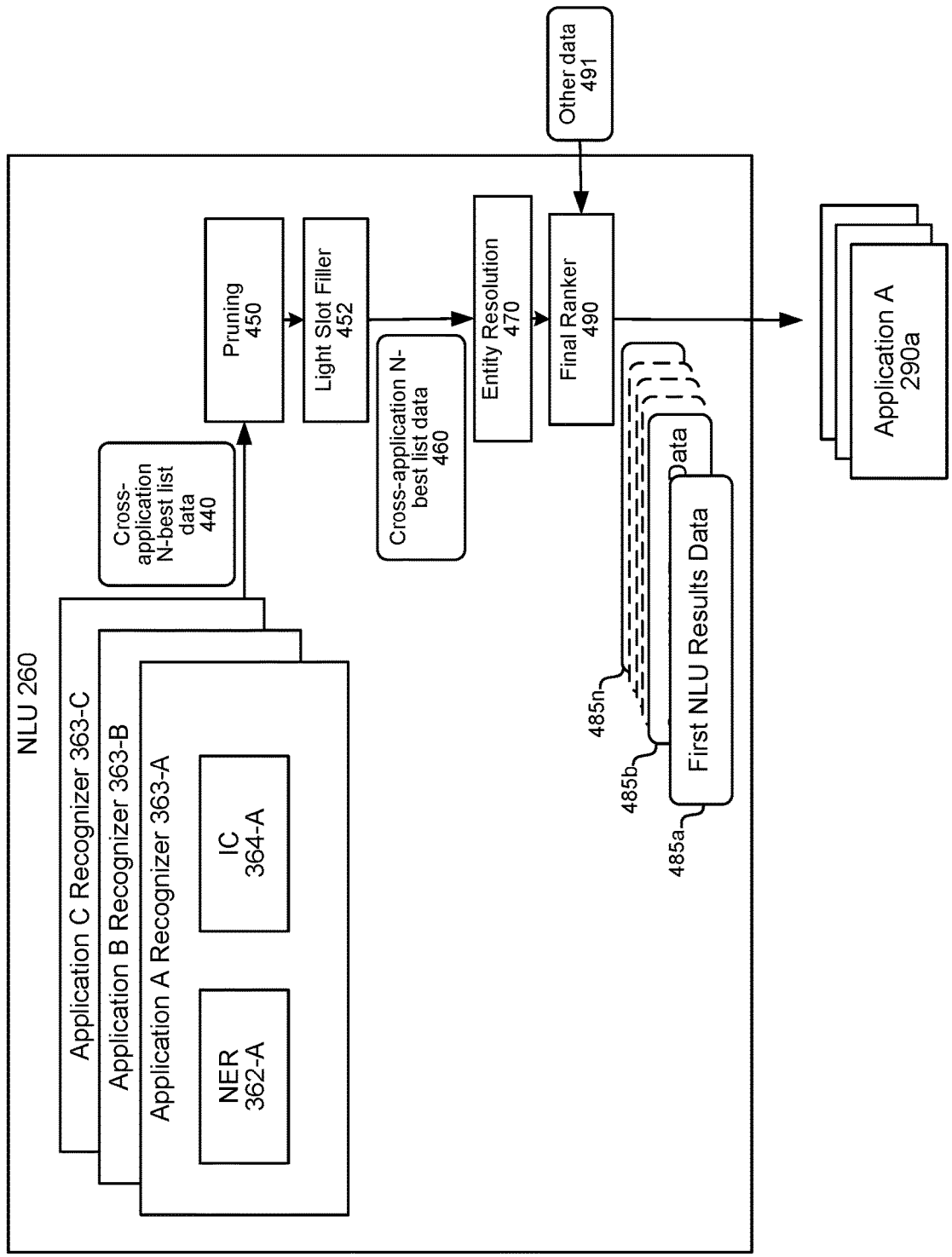
FIG. 4 is a conceptual diagram of how natural language processing is performed according to embodiments of the present disclosure.

The NLU component 260 may generate cross-application N-best list data 440 including the tagged text output by each recognizer 363 (as illustrated if FIG. 4). A recognizer 363 may output tagged text data generated by an NER component 362 and an IC component 364 operated by the recognizer 363, as described herein above. Each entry of tagged text represented in the cross-application N-best list data 440 may be associated with a respective score indicating a likelihood that the tagged text corresponds to the application 290 associated with the recognizer 363 from which the tagged text was output. For example, the cross-application N-best list data 440 may be represented as:

[0.95] Application: Music Intent: <PlayMusic> ArtistName: Lady Gaga SongName: Poker Face

[0.95] Application: Video Intent: <PlayVideo> ArtistName: Lady Gaga VideoName: Poker Face

[0.01] Application: Image Intent: <DisplayImage> ArtistName: Lady Gaga AlbumName: Poker Face The NLU component 260 may send the cross-application N-best list data 440 to a pruning component 450. The pruning component 450 may sort the tagged text represented in the cross-application N-best list data 440 according to their respective scores. The pruning component 450 may then perform score thresholding with respect to the cross-application N-best list data 440. For example, the pruning component 450 may select tagged text entries represented in the cross-application N-best list data 440 associated with scores satisfying (e.g., meeting and/or exceeding) a threshold score. The pruning component 450 may also or alternatively perform number of tagged text entry thresholding. For example, the pruning component 450 may select a maximum threshold number of top scoring tagged text entries. The pruning component 450 may generate cross-application N-best list data 460 including the selected tagged text entries. The purpose of the pruning component 450 is to create a reduced list of tagged text entries so that downstream, more resource intensive, processes may only operate on the tagged text entries that most likely correspond to the command input to the system.

The NLU component 260 may also include a light slot filler component 452. The light slot filler component 452 can take text from slots represented in the tagged text entries output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-application N-best list data 460.

The NLU component 260 sends the cross-application N-best list data 460 to an entity resolution component 470. The entity resolution component 470 can apply rules or other instructions to standardize labels or tokens from previous stages into an intent/slot representation. The precise transformation may depend on the application 290. For example, for a travel application, the entity resolution component 470 may transform text corresponding to "Boston airport" to the standard BOS three-letter code referring to the airport. The entity resolution component 470 can refer to the knowledge base 372 that is used to specifically identify the precise entity referred to in each slot of each tagged text entry represented in the cross-application N-best list data 460. Specific intent/slot combinations may also be tied to a particular source, which may then be used to resolve the text. In the example "play songs by the stones," the entity resolution component 470 may reference a personal music catalog, Amazon Music account, a user profile 502 (described herein below), or the like. The entity resolution component 470 may output data including an altered N-best list that is based on the cross-application N-best list data 460, and that includes more detailed information (e.g., entity IDs) about the specific entities mentioned in the slots and/or more detailed slot data that can eventually be used by an application 290. The NLU component 260 may include multiple entity resolution components 470 and each entity resolution component 470 may be specific to one or more applications 290.

The entity resolution component 470 may not be successful in resolving every entity and filling every slot represented in the N-best list represented in the cross-application N-best list data 460. This may result in the entity resolution component 470 outputting incomplete results. The NLU component 260 may include a final ranker component 490. The final ranker component 490 may assign a particular confidence score to each tagged text entry input therein. The confidence score of a tagged entry may represent a confidence of the system in the NLU processing performed with respect to the tagged entry. The confidence score of a particular tagged text entry may be affected by whether the tagged text entry has unfilled slots. For example, if a tagged text entry associated with a first application includes slots that are all filled/resolved, that tagged text entry may be assigned a higher confidence score than another tagged text entry including at least some slots that are unfilled/unresolved by the entity resolution component 470.

The final ranker component 490 may apply re-scoring, biasing, or other techniques to determine the top scoring tagged text entries. To do so, the final ranker component 490 may consider not only the data output by the entity resolution component 470, but may also consider other data 491. The other data 491 may include a variety of information. For example, the other data 491 may include application rating or popularity data. For example, if one application has a high rating, the final ranker component 490 may increase the score of a tagged text entry output by a recognizer 363 associated with that application. The other data 491 may also include information about applications that have been enabled by the user that input the command to the system. For example, the final ranker component 490 may assign higher scores to tagged text entries output by recognizers 363 associated with enabled applications than tagged text entries output by recognizers 363 associated with non-enabled applications. The other data 491 may also include data indicating user usage history, such as if the user that input the command to the system regularly uses a particular application or does so at particular times of day. The other data 491 may additionally include data indicating date, time, location, weather, type of device 110, user ID, context, as well as other information. For example, the final ranker component 490 may consider when any particular application is currently active (e.g., music being played, a game being played, etc.).

Following final ranking, the NLU component 260 may output NLU results data 485. The NLU component 260 may send the NLU results data 485 to the orchestrator component 230, which sends the NLU results data 485 to the application(s) 290 represented in the NLU results data 485. The NLU results data 485 may include first NLU results data 485a including tagged text associated with a first application, second NLU results data 485b including tagged text associated with a second application, etc. The NLU results data 485 may include tagged text data corresponding to at least one of the top scoring tagged text entries as determined by the final ranker component 490.

Figure 5:
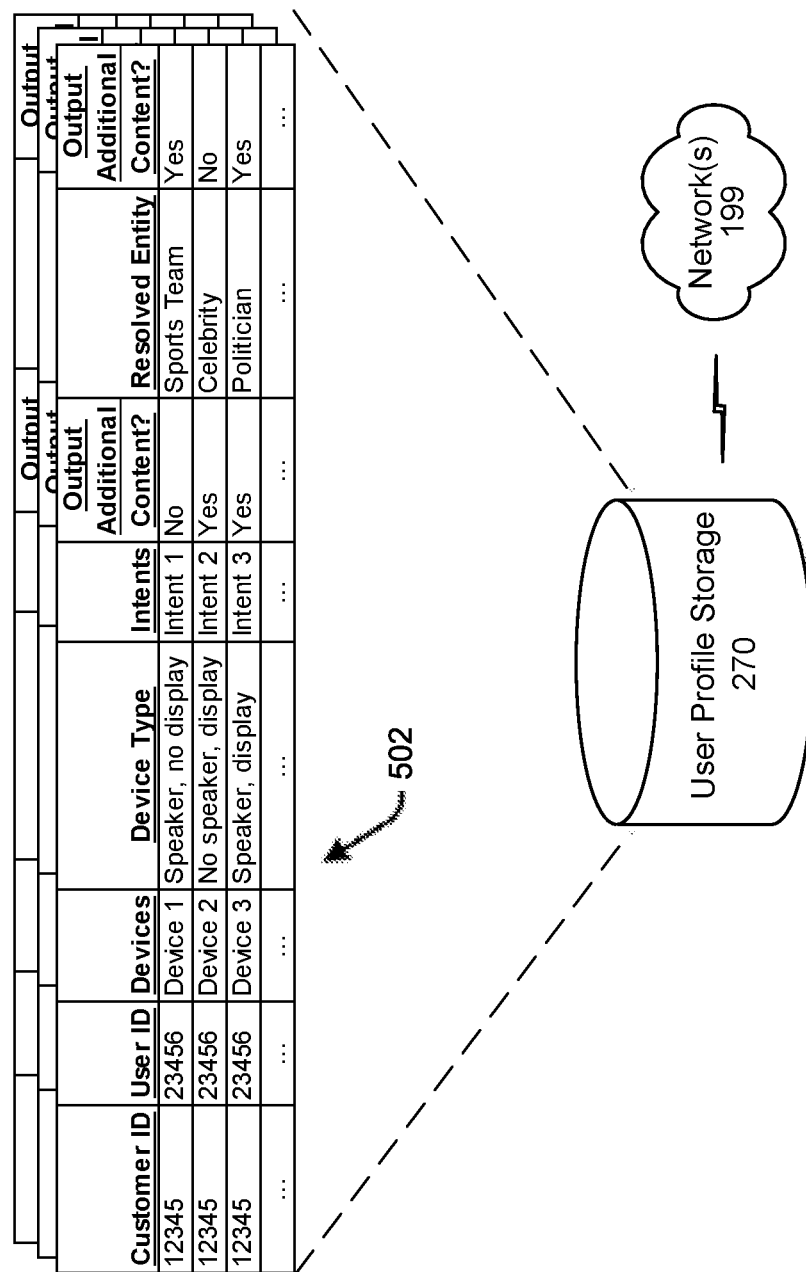
FIG. 5 illustrates data stored and associated with user profiles according to embodiments of the present disclosure.

FIG. 5 illustrates the user profile storage 270 that includes data regarding customer profiles as well as individual user profiles 502. Each user profile 502 may include information indicating various devices. For each of the various devices, the user profile 502 may indicate the device's type (e.g., output capabilities of the device). Each user profile 502 may also include information indicating intents. For each intent, the user profile 502 may indicate a user preference regarding whether the user 5 wants the system to provide additional content when the user 5 inputs a command corresponding to the intent to the system. Each user profile 502 may further include information indicating resolved entities. For each resolved entity, the user profile 502 may indicate a user preference regarding whether the user 5 wants the system to provide additional content when the user 5 inputs a command including the resolved entity to the system. Each user profile 502 may additionally include other data not explicitly illustrated.

FIG. 6 illustrates how a system may determine additional content associated with but not directly responsive to a command as well as determine whether the additional content should be output to a user. As illustrates, the various components in FIG. 6 communicate directly. It should be appreciated that some or all of the components illustrated in FIG. 6 may communicate through the orchestrator component 230. In addition, while FIG. 6 illustrates a dedicated content generation component 265, it should be appreciated that some or all of the processes performed by the content generation component 265 disclosed herein may be performed by the orchestrator component 230.

Each time the NLU component 260 outputs NLU results data 485, the system may send the NLU results data 485 to the content generation component 265. The content generation component 265 determines whether additional content associated with but not directly responsive to the command should be output to the command originating user 5.

The content generation component 265 may base its determinations at least in part on non-user specific data, such as application provided data, system generated intent pairs, etc.

The content generation component 265 may determine whether additional content should be output based on data accompanying output content data provided to the server(s) 120 by an application 290. Such data may be represented as other data 608. In addition to providing the server(s) 120 with output content data responsive to the command, the application 290 may additionally provide the server(s) 120 with presentation framework data. The presentation framework data may include information indicating the types of content (e.g., audio, image, video, etc.) represented in the output content data as well as one or more devices associated with the command originating user 5 that should be used to output the different types of content. The presentation framework data may, in some instances, also include information indicating the server(s) 120 should determine additional content associated with the output content data, but which is not directly responsive to the command. When the presentation framework data includes such information, the content generation component 265 may determine additional content may be output.

The content generation component 265 may also determine whether additional content should be output based on data provided to the server(s) 120 by an application 290, with the data not accompanying output content data. Such data is represented as other data 608. An application 290 may provide the server(s) 120 with data indicating that any time the NLU results data 485 indicate a particular intent, the content generation component 265 should solicit the application 290 as to whether the application 290 has additional content that may be output. For example, a concert ticket application may provide the server(s) 120 with data indicating that anytime the NLU results data 485 indicate a <PlayMusic> intent, the content generation component 265 should solicit the concert ticket application as to whether the concert ticket application has access to information indicating a concert put on by a resolved artist entity represented in the NLU results data 485. For further example, an electronic calendar application may provide the server(s) 120 with data indicating that anytime the NLU results data 485 indicate an <OutputTime> intent, the content generation component 265 should solicit the electronic calendar application as to whether the electronic calendar application has calendar entries associated with an electronic calendar associated with the command originating device 110 and/or user 5. Yet further, for example, a traffic report application may provide the server(s) 120 with data indicating that anytime the NLU results data 485 indicate a <BookRide>intent, the content generation component 265 should solicit the traffic report application to provide current traffic report information.

The content generation component 265 may also determine whether additional content should be output based on the intent represented in the NLU results data 485. The system may store intent pair data (illustrated as other data 608) corresponding to pairs of intents. Each pair of intents may be associated with a respective score representing a likelihood that a second intent of the pair will be invoked by a user within a time threshold subsequent to content responsive to the first intent being output. The scores of various intent pairs may be normalized. The intent pair data may be untailored with respect to any given user of the system. For example, the intent pair data may include the following intent pairs with corresponding scores:

[0.345] <GetWeather>; <GetTraffic>
[0.217] <OrderPizza>; <PlayMovie>
[0.121] <PlayMusic>; <SetVolume>

The intent pair data may be configured based solely upon the natures of the intents. For example, a pair of intents may include a <PlayMusic> intent and a <ChangeVolume> intent. The pair of intents may be associated with a score representing a likelihood that a user may input a first command corresponding to the <PlayMusic> intent immediately prior to the user inputting a second command corresponding to the <ChangeVolume> intent based solely on the <PlayMusic> intent and the <ChangeVolume> intent both relating to output of audio from the system. For further example, a pair of intents may include a <BookPlaneTicket> intent and a <GetWeather> intent. This pair of intents may be associated with a score indicating a likelihood that users who by plane tickets often ask about the weather for their destination.

Intent may also be paired based on system user history associated with various different users. Pairing of the intents may be application agnostic. Thus, both the first intent and the second intent of a pair of intents may be associated with a single application, or the first intent of the pair may be associated with a first application while the second intent of the pair may be associated with a second application. For example, a pair of intents may include a <PlayMusic> intent and a <ChangeVolume> intent, where both the <PlayMucic> intent and the <Change Volume> intent correspond to a music application. For further example, a pair of intents may include a <BookPlaneTicket> intent and a <GetWeather> intent, where the <BookPlaneTicket> intent corresponds to a booking application and the <GetWeather> intent corresponds to a weather application. Pairing of the intents may also be agnostic with respect to the 1P or 3P nature of the applications associated with the intents. That is, both of the intents of a pair may be associated with one or more 1P applications, both of the intents of a pair may be associated with one or more 3P applications, or a first intent of a pair may be associated with a 1P application while the second intent of the pair is associated with a 3P application. For example, a pair of intents may include a <PlayMusic> intent and a <ChangeVolume> intent, where both the <PlayMusic> intent and the <Change Volume> intent are executed by a 1P application. For further example, a pair of intents may include a <PlayMusic> intent and a <ChangeVolume> intent, where both the <PlayMusic> intent and the <Change Volume> intent are executed by a 3P music application. For further example, a pair of intents may include a <BookPlaneTicket> intent and a <PlayMusic> intent, where the <BookPlaneTicket> intent is executed by a 3P application and the <PlayMusic> intent is executed by a 1P application.

The intent pair data may alternatively be user-specific. For example, if a user routinely invokes a <ChangeVolume> intent subsequent to a <PlayMusic> intent, the system may increase the score associated with a pair of intents corresponding to these intents. Conversely, if the user rarely invokes the <ChangeVolume> intent subsequent to the <PlayMusic> intent, the system may decrease the score associated with a pair of intents correspond to these intents.

The content generation component 265 may also base its determinations at least in part on presently input command originating user-specific data. Each user may have a different tolerance regarding how many times additional content is output in a given period of time, what kinds of additional content are output, as well as how additional content is presented.

The content generation component 265 may receive user identity data 606 from the user recognition component 295. The user identity data 606 may indicate the presently input command originating user 5. The content generation component 265 may then receive user profile data 604 from the user profile storage 270, with the user profile data 604 being specific to the command originating user 5.

The user profile data 604 may indicate a maximum number of times the user 5 has indicated the system should output additional content in a specific period of time (e.g., twice/hour, ten (10) times/day, etc.). The maximum number of times may be irrespective to any specific application 290, resolved entity, intent, or the like. For example, the user profile data 604 may indicate the system should output additional content a maximum of ten (10) times a day. If the content generation component 265 determines the system has output additional content to the user 5 less than ten (10) times prior to input of the present command, the content generation component 265 may generate content generation data 610 indicating additional content should be output with a response to the present command. If the content generation component 265 determines the system has already output additional content to the user 5 ten (10) times prior to input of the present command, the content generation component 265 may not generate content generation data 610, thereby ending processing with respect to the output of additional content and thereby resulting in additional content not being output by the system.

The user profile data 604 may also indicate a user preference regarding how often (e.g., a frequency) additional content associated with a content type may be output in a specific amount of time. Alternatively, the user profile data 604 may indicate a user preference regarding how often additional content may be output in a specific amount of time with respect to a content type of the input command. Content types include, but are not limited to, songs, news information, videos, concert ticket offers, shopping discounts, and newly available Alexa skills. For example, a first user preference of a first user may indicate additional content corresponding to songs may be output ten (10) times a day whereas a second user preference of a second user may indicate additional content corresponding to songs may be output two (2) times a week. For further example, a first user preference of a first user may indicating additional content may be output with respect to ten (10) input commands corresponding to requests to play music in a single day whereas a second user preference of a second user may indicate additional content may be output with respect to two (2) input command corresponding to requests to play music in a single a week.

The user profile data 604 may also indicate a user preference regarding the times at which the command originating user 5 permits the system to provide additional content. For example, the user preference may indicate the system is permitted to output a first amount of additional content over the duration of a morning and permitted to output a second amount of additional content over the duration of an evening. The content generation component 265 may determine a time corresponding to the presently input command based on time information represented in the other data 608. If the content generation component 265 determines the system has output additional content to the user 5 less times than that permitted (as indicated by the user preference) for the time corresponding to the present command, the content generation component 265 may generate content generation data 610. If the content generation component 265 determines the system has already output additional content a number of permitted times (as indicated by the user preference) for the time corresponding to the present command, the content generation component 265 may not generate content generation data 610.

The user profile data 604 may also indicate a user preference regarding the types of input commands with respect to which the user 5 permits, as well as does not permit, the system to output additional content. For example, the user preference may indicate the system may output additional content when the input command corresponds to a request to play music. For further example, the user preference may indicate the system may not output additional content when the input command corresponds to a request to purchase a product using a shopping application. If the content generation component 265 determines the current intent corresponds to one with respect to which the system is permitted (as indicated by the user preference) to output additional content, the content generation component 265 may generate content generation data 610. If the content generation component 265 determines the current intent corresponds to one with respect to which the system is not permitted (as indicated by the user preference) to output additional content, the content generation component 265 may not generate content generation data 610.

The user profile data 604 may also indicate various characteristics of the user 5. The user profile data 604 may indicate an age of the user 5, as users of different ages may be susceptible to receiving different amounts and/or kinds of additional content. The user profile data 604 may also indicate a culture of the user 5, as users of different cultures may be susceptible to receiving different amounts and/or kinds of additional content. The user profile data 604 may also indicate a geographic region, country, or other geographic location corresponding to the user's residence, as users residing in different geographic locations may be susceptible to receiving different amounts and/or kinds of additional content. If the content generation component 265 determines the characteristics of the user 5 indicate additional content should be output, the content generation component 265 may generate content generation data 610. If the content generation component 265 determines the characteristics of the user 5 indicate additional content should not be output, the content generation component 265 may not generate content generation data 610.

The user profile data 604 may also indicate a user preference regarding resolved entities with respect to which additional content should be output. For example, the user preference may indicate the system should output additional content any time the NLU results data 485 indicates a resolved entity corresponding to a particular sports team. For further example, the user preference may indicate the system should not output additional content any time the NLU results data 485 indicates a resolved entity corresponding to a celebrity. If the content generation component 265 determines at least one resolved entity represented in the NLU results data 485 corresponds to an entity with respect to which the user preference indicates additional content should be output, the content generation component 265 may generate content generation data 610. If the content generation component 265 determines at least one of the resolved entities represented in the NLU results data 485 corresponds to an entity with respect to which the user preference indicates additional content should not be output, the content generation component 265 may not generate content generation data 610.

The other data 608 may indicate a region, country, or other geographic location of the command originating device 110, as users interacting with devices 110 located in different geographic locations may be susceptible to receiving different amounts and/or kinds of additional content. If the content generation component 265 determines the geographic location of the command originating device 110 indicates additional content should be output, the content generation component 265 may generate content generation data 610. If the content generation component 265 determines the geographic location of the command originating device 110 indicates additional content should not be output, the content generation component 265 may not generate content generation data 610.

The other data 608 may also include information representing the command originating user's system usage history. The user's system usage history may represent data corresponding to instances of previous user input commands, ASR results, NLU results, as well as other processing results data. The content generation component 265 may determine one or more trends in the command originating user's system usage history. For example, the content generation component 265 may determine the user 5 routinely inputs a command to output weather information for a location immediately following the input of a command to book a flight to the location. The content generation component 265 may also determine whether a current context (e.g., the current ASR results, current NLU results, etc.) correspond to any of the determined trends. If the content generation component 265 determines the current context corresponds to at least one trend, the content generation component 265 may generate content generation data 610.

The other data 608 may also include data representing previously provided user feedback indicating the appropriateness of previously output additional content. The other data 608 may also include social media data associated with the user, system usage history associated with the user, a history of music listened to by the user, a history of books purchased by the user, a general purchasing history of the user, a system browsing history of the user, a travel history of the user, information from the user's electronic calendar, etc.

The content generation component 265 may run one or more machine learned models that enable the content generation component 265 to perform the determinations described herein above. The model(s) run by the content generation component 265 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the content generation component 265, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The model(s) run by the content generation component 265 may include application specific rules. Thus, if the NLU results data 485 are associated with a specific application, the model(s) may execute application specific rules that are only associated with the specific application. For example, the model(s) may include music application specific rules that indicate additional content should never by output when the music application is represented in NLU results data 485 since the output of the music application is long form music content. The portions of the model(s) specific to one or more applications 290 may be considered static because they may remain constant overtime.

The model(s) run by the content generation component 265 may also be personalized to the command originating user at runtime. That is, the model(s) may be trained to consider a variety of information and, at runtime, the content generation component 265 may run the model(s) with respect to a variety of information specific to the command originating user 5.

A user may provide the system with feedback regarding the appropriateness of output additional content. Such feedback may be positive or negative. Moreover, a user may provide feedback to the system by speaking the feedback to the device 110a, by interacting with a touchscreen of the device 110b, by performing a gesture (e.g., thumbs up, thumbs down, etc.) that is captured by a camera of the device (110a/110b), etc. The system may train or retrain the model(s) using the feedback provided by the user so the content generation component 265 does not determine additional content should be output if the current context corresponds to a previous instance where the user provided feedback indicating the additional content was not applicable to the user or otherwise inappropriate/unnecessary from the user's perspective.

The content generation component 265 may compile all applicable other data 608 and user preferences indicated in the user profile data 604 into a multi-dimensional feature vector. The content generation component 265 may impose a feature vector dimension threshold to determine whether to run the machine learned model(s) or to use system default rules with respect to when additional content should be output. It will be appreciated that the more user-specific dimensions a feature vector has, the more user specific the output of the model(s) may be. It will also be appreciated that running a model(s) may be operationally intensive. Thus, the feature vector dimension threshold may be configured at a value representing a diminishing return of user-specific model(s) output. That is, if the multi-dimensional feature vector includes a number of dimensions not satisfying (e.g., falling below) the feature vector dimension threshold, the veracity of a user-specific model(s) output based on the multi-dimensional feature vector does not outweigh the operational intensity of running the model(s).

The system default rules for determining when additional content should be output may be configured with respect to a default user. For example, the system default rules may be based on the culture of a default user, the geographic location (e.g., country, region, etc.) of a default user, the maximum number of time a default user would permit the system to output additional content in a specific period of time, etc.

If the content generation component 265 generates content generation data 610 indicating additional content should be output with a response to the present command, the content generation component 265 sends the content generation data 610 to a contention generation application 290a configured to determine additional content associated with but not directly responsive to the current command. The content generation data 610 may include at least a portion of the NLU results data 485, and optionally at least a portion of the user profile data 604 and/or at least a portion of the other data 608.

The content generation data 610 may indicate a specific application that should be solicited for additional information. As described above, an application may provide the server(s) 120 with data indicating that any time the NLU results data 485 indicate a particular intent, the content generation component 265 should solicit the application 290 as to whether the application 290 has additional content that may be output. When the content generation component 265 determines the NLU results data 485 indicate the particular intent, the content generation data 610 may include an indication that the content generation application 290a should solicit the specific application for additional content associated with one or more resolved entities represented in the NLU results data 485.

The content generation application 290a may determine an application 290b from which to receive additional content data from based on the NLU results data 485. For example, the content generation application 290a may determine the NLU results data 485 include a <PlayMusic>intent and a resolved artist of "Adele." Based thereon, the content generation application 290a may determine a concert booking application from which to receive additional content data from.

The content generation application 290a (or the orchestrator component 230) may send the application 290b additional content request data 612 indicating at least a portion of the resolved entities represented in the NLU results data 485 that the application 290b may need to determine additional content. The system may determine first output data responsive to the input command prior to determining the application 290b from which to receive additional content. Alternatively, the system may determine the application 290b from which to receive additional content after determining the NLU results data 485 but prior to receiving first output data.

The application 290b provides the content generation application 290a with additional content data 614 corresponding to additional content associated with but not directly responsive to the input command. The content generation application 290a then causes a device 110 to output additional content corresponding to the additional content data 614 to the user 5. The additional content may be output as TTS synthesized speech, displayed text, etc.

In some instances, the application 290b may be unable to determine additional content. The application 290b may provide the content generation application 290a with an indication of such, in which case the contention generation application 290a may indicate same to the orchestrator component 230. In response, the orchestrator component 230 may simply cause a device 110 to output content directly responsive to the command to the user 5.

The content generation data 610 may indicate a modality that additional content should be output in. The modality the additional content should be output in may be represented in the user profile data 604 input to the content generation component 265. For example, the user profile data 604 may indicate a user preference indicating that the user 5 prefers the system output additional visual content over additional audio content. In such a case, the additional content request data 612 may include a request for image data or video data if such can be obtained or generated by the application 290b.

The content generation component 265 may determine whether additional content should be output while content responsive to an input command is output by the system. The device (110a/110b) may receive a command to cease output of the content responsive to the command while the content is be output. For example, while a song is being output, a user may say "Alexa, cancel." The device (110a/110b) sends input data representing the user's cease output command to the server(s) 120.

The server(s) 120 processes the input data (e.g., by performing ASR and/or NLU) to determine an intent to cease output of the content. The content generation component 265 then determines additional content should not be output based on the intent to cease output of the original content.

The device (110a/110b) may alternatively receive a command to decrease output of additional content while content responsive to a command is being output. For example, while plane ticket booking information is being output, a user may say "Alexa, only output additional content 3 times a week."

The server(s) 120 processes the input data to determine an intent to decrease or otherwise alter a frequency at which additional content should be output. The content generation component 265 then determines a frequency at which additional content was output prior to receiving the current command. If the frequency at which additional content was output is equal to or greater than the decreased or otherwise altered frequency, the content generation component 265 determines to not output additional content. If the frequency at which additional content was output is less than the decreased or otherwise altered frequency, the content generation component 265 may determine to output additional content using the teachings disclosed herein.

Figure 7B:
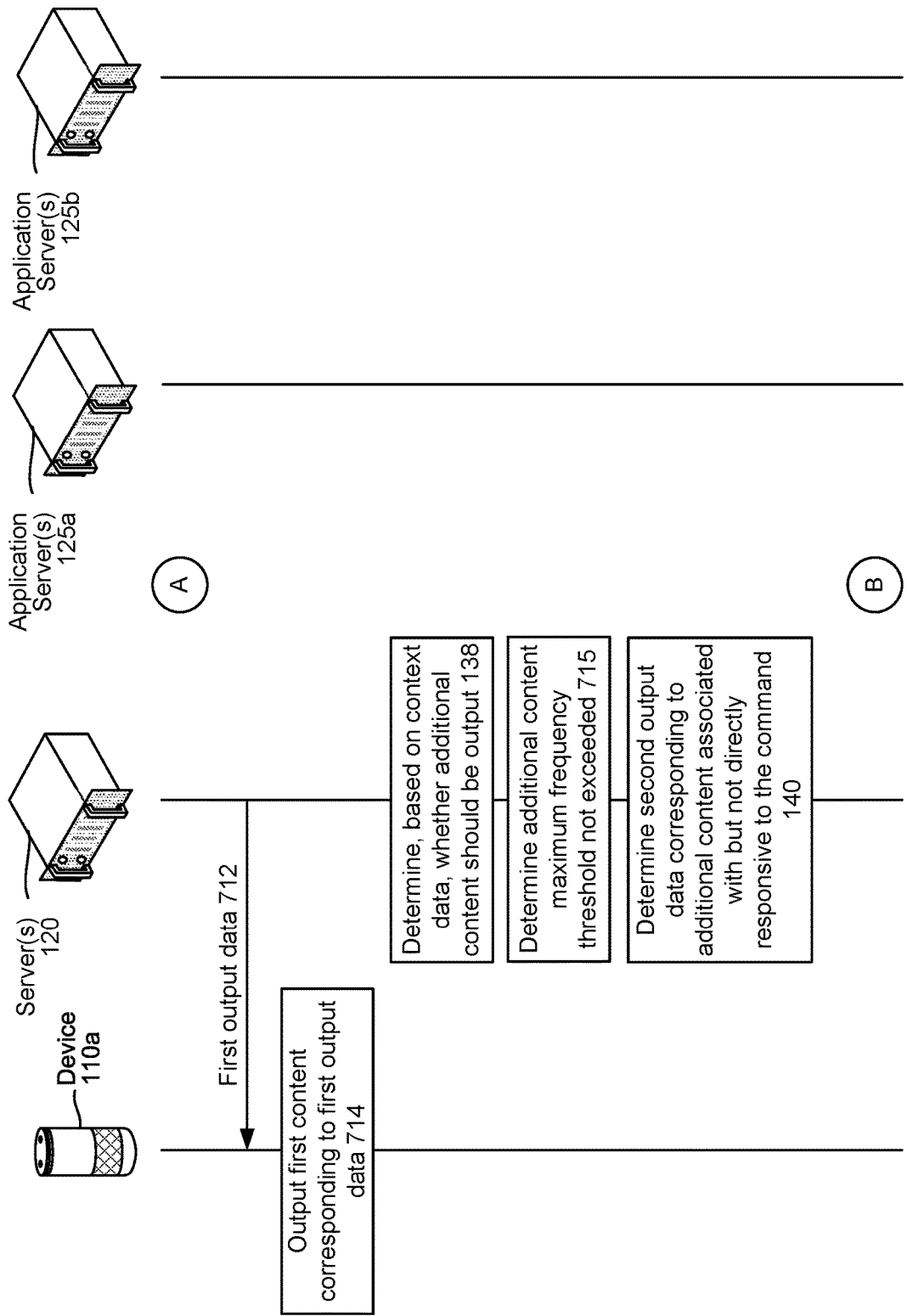

FIGS. 7A through 7C illustrate the output of additional content to a user 5. The device 110a receives (702) input audio corresponding to an utterance, generates (704) input audio data corresponding to the input audio, and sends (706) the input audio data to the server(s) 120.

The server(s) 120 performs (130) performs ASR on the input audio data to generate input text data. The server(s) 120 then performs (132) NLU on the input text data to determine a command. The server(s) 120 may send (708) a signal requesting first output data responsive to the command to an application server(s) 125a associated with the command. The signal may include NLU results data that may be processed by the application server(s) 125*a*. The server(s) 120 receives (710) first output data corresponding to first output content responsive to the command from the application server(s) 125*a*. The server(s) 120 sends (712) the first output data to the device 110*a*. Thereafter, the device 110*a* outputs (714) first content corresponding to the first output data.

The server(s) 120 also determines (138), based on context data, whether additional content should be output, as described in detail herein above. The server(s) 120 may also determine (715) whether an applicable user-specific maximum frequency threshold has been exceeded. If the server(s) 120 determines additional content should be output and if the server(s) 120 determines an applicable maximum frequency threshold has not been exceeded, the server(s) 120 determines (140) second output data corresponding to additional content associated with but not directly responsive to the command. The server(s) 120 may send (716) a signal requesting second output data corresponding to additional content to an application server(s) 125*b*. The signal may include NLU results data that may be processed by the application server(s) 125*b*. The NLU results data sent to the application server(s) 125*b* may be generated using NLU components (e.g., an NER component and an IC component) trained with respect to the application server(s) 125*b*. The NLU results data sent to the application server(s) 125*a* and the NLU results data sent to the application server(s) 125*b* may be different. The server(s) 120 receives (717) second output data corresponding to additional content from the application server(s) 125*b*. The server(s) 120 sends (718) the second output data to the device 110*a*. Thereafter, the device 110*a* outputs (720) second content corresponding to the second output data. The second content may be TTS synthesized speech, a displayed image, a displayed video, displayed text, etc.

The server(s) 120 may send the first output data to the device 110*a* prior to sending the second output data to the device 110*a*. Alternatively, the steps of FIGS. 7A-7C may be performed in a manner that enables the server(s) 120 to send the first output data and the second output data at or substantially at the same time.

The device 110*a* may output the content directly responsive to the command prior to outputting the additional content. Alternatively, the device 110*a* may output the additional content prior to outputting the content directly responsive to the command.

Figure 8:
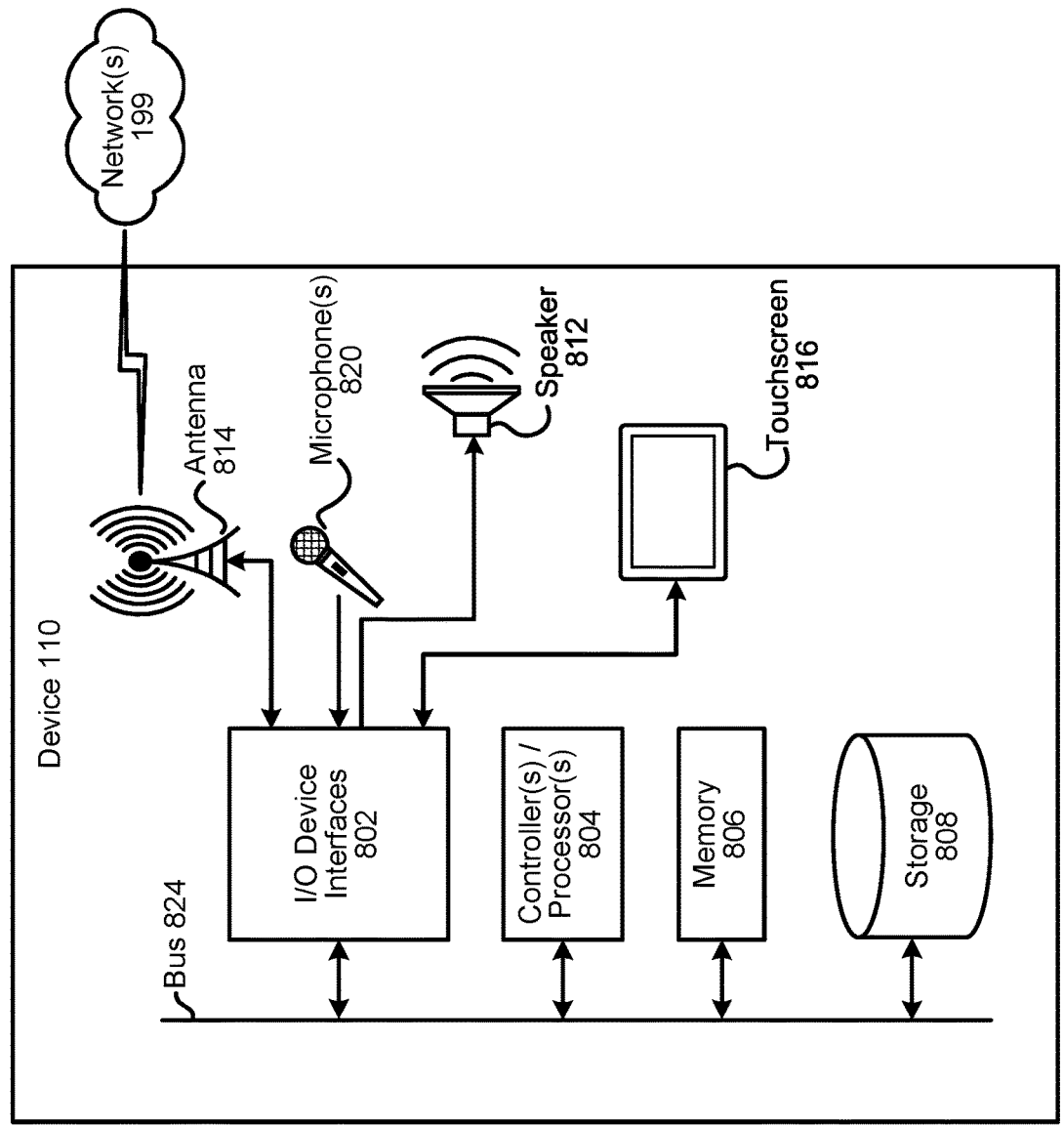
FIG. 8 is a block diagram conceptually illustrating example components of a device according to embodiments of the present disclosure.
Figure 9:
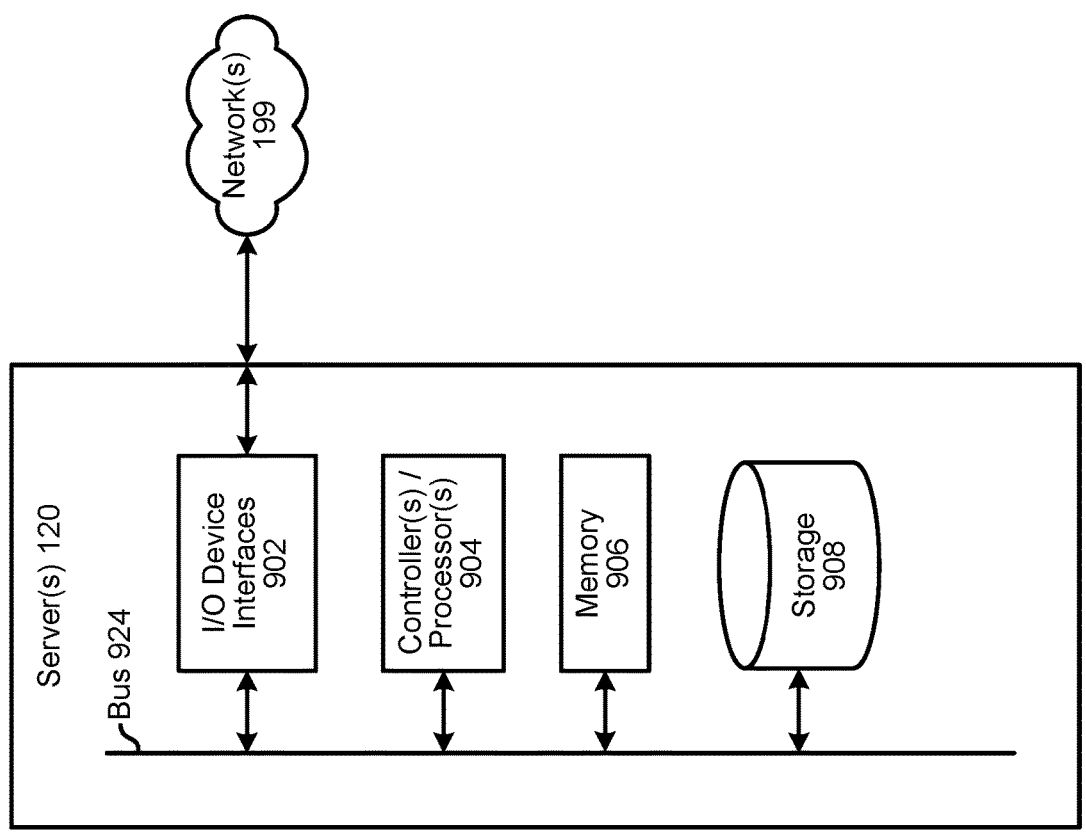
FIG. 9 is a block diagram conceptually illustrating example components of a server according to embodiments of the present disclosure.

FIG. 8 is a block diagram conceptually illustrating a user device 110 that may be used with the system. FIG. 9 is a block diagram conceptually illustrating example components of a remote device, such as the server(s) 120, which may assist with ASR processing, NLU processing, or command processing. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/802). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (802/902) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (802/902), processor(s) (804/904), memory (806/906), and/or storage (808/908) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 10:
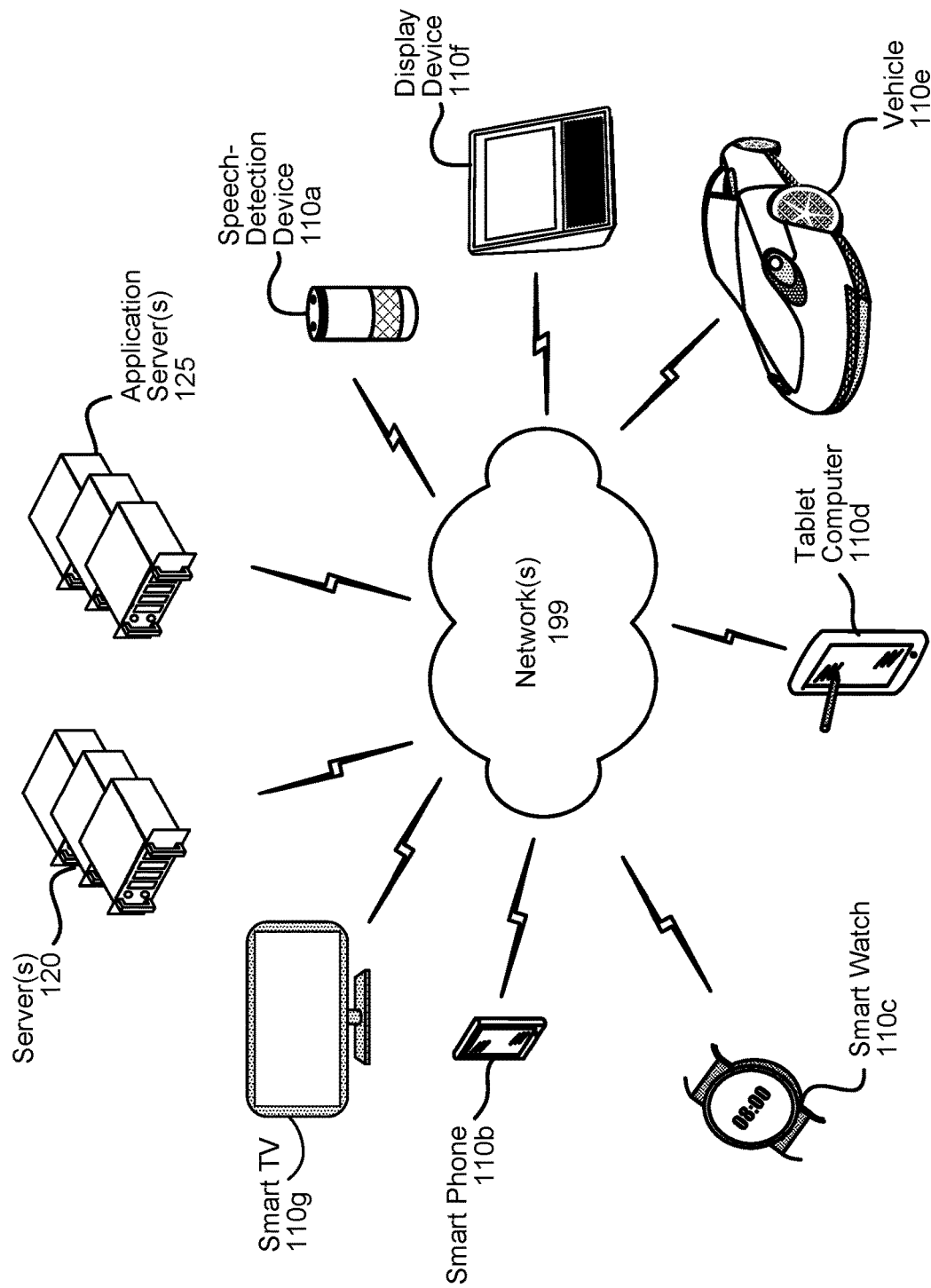
FIG. 10 illustrates an example of a computer network for use with the speech processing system.

As illustrated in FIG. 10, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart TV 110g may be connected to the network(s) 199 through a wireless service provider, over a WiFi or cellular network connection, or the like. Other devices are included as network-connected support devices, such as the server(s) 120, application server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, from a first device, input data corresponding to a first command;
determining first output data responsive to the first command;
determining user profile data associated with the first device;
based at least in part on the user profile data, determining additional content is to be output, wherein the additional content is nonresponsive to the first command;
determining second output data corresponding to additional content;
causing at least one device associated with the user profile data to present a first output corresponding to the first output data; and
causing the at least one device to present a second output corresponding to the second output data.

2. The computer-implemented method of claim 1, wherein:
causing at least one device associated with the user profile data to present the first output comprises causing the first device to present the first output; and
causing the at least one device to present the second output comprises causing the first device to present the second output.

3. The computer-implemented method of claim 1, wherein:
causing at least one device associated with the user profile data to present the first output comprises causing the first device to present the first output; and causing the at least one device to present the second output comprises causing a second device to present the second output.

4. The computer-implemented method of claim 1, wherein:
    causing at least one device associated with the user profile data to present the first output comprises causing a second device to present the first output; and
    causing the at least one device to present the second output comprises causing the first device to present the second output.

5. The computer-implemented method of claim 1, further comprising:
    determining an entity corresponding to the user profile data,
    wherein the additional content is based at least in part on the entity.

6. The computer-implemented method of claim 5, further comprising:
    processing the input data to determine the entity.

7. The computer-implemented method of claim 1, wherein determining the additional content is to be output comprises:
    determining preference data included in the user profile data; and
    determining the preference data corresponds to output of the additional content.

8. The computer-implemented method of claim 1, further comprising:
    performing synthesized speech processing to determine the second output data representing synthesized speech corresponding to the additional content.

9. The computer-implemented method of claim 8, further comprising:
    determining image data corresponding to the first output data,
    wherein causing the at least one device associated with the user profile data to present the first output comprises causing the at least one device to display an output using the image data.

10. The computer-implemented method of claim 1, further comprising:
    causing presentation of the second output to occur after causing presentation of the first output.

11. A system comprising:
    at least one processor; and
    at least one memory comprising instructions that, when executed by the at least one processor, cause the system to:
        receive, from a first device, input data corresponding to a first command;
        determine first output data responsive to the first command;
        determine user profile data associated with the first device;
        based at least in part on the user profile data, determine additional content is to be output, wherein the additional content is nonresponsive to the first command;
        determine second output data corresponding to additional content;
        cause at least one device associated with the user profile data to present a first output corresponding to the first output data; and
        cause the at least one device to present a second output corresponding to the second output data.

12. The system of claim 11, wherein:
    the instructions that cause the at least one device associated with the user profile data to present the first output comprise instructions that, when executed by the at least one processor, cause the system to cause the first device to present the first output; and
    the instructions that cause the at least one device associated with the user profile data to the instructions that cause the at least one device associated with the user profile data to present the second output comprise instructions that, when executed by the at least one processor, cause the system to cause the first device to present the second output.

13. The system of claim 11, wherein:
    the instructions that cause the at least one device associated with the user profile data to present the first output comprise instructions that, when executed by the at least one processor, cause the system to cause the first device to present the first output; and
    the instructions that cause the at least one device associated with the user profile data to the instructions that cause the at least one device associated with the user profile data to present the second output comprise instructions that, when executed by the at least one processor, cause the system to cause a second device to present the second output.

14. The system of claim 11, wherein:
    the instructions that cause the at least one device associated with the user profile data to present the first output comprise instructions that, when executed by the at least one processor, cause the system to cause a second device to present the first output; and
    the instructions that cause the at least one device associated with the user profile data to the instructions that cause the at least one device associated with the user profile data to present the second output comprise instructions that, when executed by the at least one processor, cause the system to cause the first device to present the second output.

15. The system of claim 11, wherein the at least one memory further comprises instructions that, when executed by the at least one processor, further cause the system to:
    determine an entity corresponding to the user profile data,
    wherein the additional content is based at least in part on the entity.

16. The system of claim 15, wherein the at least one memory further comprises instructions that, when executed by the at least one processor, further cause the system to:
    process the input data to determine the entity.

17. The system of claim 16, wherein the instructions that cause the system to determine the additional content is to be output comprise instructions that, when executed by the at least one processor, cause the system to:
    determine preference data included in the user profile data; and
    determine the preference data corresponds to output of the additional content.

18. The system of claim 11, wherein the at least one memory further comprises instructions that, when executed by the at least one processor, further cause the system to:
    perform synthesized speech processing to determine the second output data representing synthesized speech corresponding to the additional content.

19. The system of claim 18, wherein the at least one memory further comprises instructions that, when executed by the at least one processor, further cause the system to:
    determine image data corresponding to the first output data, wherein the instructions that cause the at least one device associated with the user profile data to present the first output comprise instructions that, when executed by the at least one processor, cause the system to cause the at least one device to display an output using the image data.

20. The system of claim 11, wherein the at least one memory further comprises instructions that, when executed by the at least one processor, further cause the system to:
 cause presentation of the second output to occur after causing presentation of the first output.

\* \* \* \* \*